United States Patent
Lee

(10) Patent No.: US 12,288,858 B2
(45) Date of Patent: Apr. 29, 2025

(54) BATTERY MODULE AND BATTERY PACK INCLUDING THE SAME

(71) Applicant: LG ENERGY SOLUTION, LTD., Seoul (KR)

(72) Inventor: Jin Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 200 days.

(21) Appl. No.: 17/297,222

(22) PCT Filed: Mar. 13, 2020

(86) PCT No.: PCT/KR2020/003497
§ 371 (c)(1),
(2) Date: May 26, 2021

(87) PCT Pub. No.: WO2020/189965
PCT Pub. Date: Sep. 24, 2020

(65) Prior Publication Data
US 2022/0029222 A1    Jan. 27, 2022

(30) Foreign Application Priority Data
Mar. 15, 2019   (KR) .................. 10-2019-0030175

(51) Int. Cl.
*H01M 10/6562* (2014.01)
*A62C 3/16* (2006.01)
(Continued)

(52) U.S. Cl.
CPC ..... *H01M 10/6562* (2015.04); *H01M 10/613* (2015.04); *H01M 10/625* (2015.04);
(Continued)

(58) Field of Classification Search
CPC .......... H01M 10/6562; H01M 10/613; H01M 10/647; H01M 10/658; H01M 50/505; H01M 50/24
See application file for complete search history.

(56) References Cited

FOREIGN PATENT DOCUMENTS

| CN | 207134409 U |   | 3/2018 | |
|---|---|---|---|---|
| CN | 207800738 U | * | 8/2018 | ............. Y02E 60/10 |

(Continued)

OTHER PUBLICATIONS

Uchiumi et al., "JP2013246920A English Translation," Dec. 9, 2013.*

(Continued)

*Primary Examiner* — Matthew T Martin
*Assistant Examiner* — Alexandra J Simmons
(74) *Attorney, Agent, or Firm* — Birch, Stewart, Kolasch & Birch, LLP

(57) ABSTRACT

A battery module has a battery cell stack containing a plurality of battery cells, a busbar frame connected to the battery cell stack and containing a busbar, and a cover plate covering the battery cell stack and the busbar frame, wherein a cooling flow path portion through which an external air for cooling inflows or outflows is formed between the cover plate and the battery cell stack. A thermal expansion member is formed in the cooling flow path portion, and wherein the thermal expansion member includes a first thermal expansion member located on a side opposite to one side where the busbar is located on the basis of the cooling flow path portion.

13 Claims, 6 Drawing Sheets

(51) Int. Cl.
*H01M 10/613* (2014.01)
*H01M 10/625* (2014.01)
*H01M 10/647* (2014.01)
*H01M 10/658* (2014.01)
*H01M 50/211* (2021.01)
*H01M 50/271* (2021.01)
*H01M 50/50* (2021.01)
*H01M 50/505* (2021.01)

(52) U.S. Cl.
CPC ....... *H01M 10/647* (2015.04); *H01M 10/658* (2015.04); *H01M 50/211* (2021.01); *H01M 50/271* (2021.01); *H01M 50/50* (2021.01); *H01M 50/505* (2021.01); *A62C 3/16* (2013.01); *H01M 2220/20* (2013.01)

(56) References Cited

FOREIGN PATENT DOCUMENTS

| | | |
|---|---|---|
| JP | 2007-227171 A | 9/2007 |
| JP | 2008-47325 A | 2/2008 |
| JP | 2009-37934 A | 2/2009 |
| JP | 2013246920 A * | 12/2013 ............ Y02E 60/12 |
| JP | 2015153616 A * | 8/2015 ............ Y02E 60/10 |
| JP | 2016201333 A * | 12/2016 ............ Y02E 60/10 |
| JP | 2018-98074 A | 6/2018 |
| JP | 2018098074 A * | 6/2018 ............ Y02E 60/10 |
| JP | 6365884 B2 | 8/2018 |
| JP | 2019-29126 A | 2/2019 |
| KR | 10-2017-0084004 A | 7/2017 |
| WO | WO 2018/062172 A1 | 4/2018 |

OTHER PUBLICATIONS

Kusaba et al., "JP2016201333A English Translation," Dec. 1, 2016.*
Uchida Hitoshi, "JP2018098074A English Translation," Jun. 21, 2018.*
Li, Xiong, "CN207800738U English Translation," Aug. 31, 2018.*
Aizawa; Takeshi, "JP2015153616A English Translation", Aug. 24, 2015.*
European Search Report issued in European Application No. 20 77 3068, dated Dec. 8, 2021.
International Search Report (PCT/ISA/210) issued in PCT/KR2020/003497 mailed on Jul. 2, 2020.

* cited by examiner

[FIG. 1]
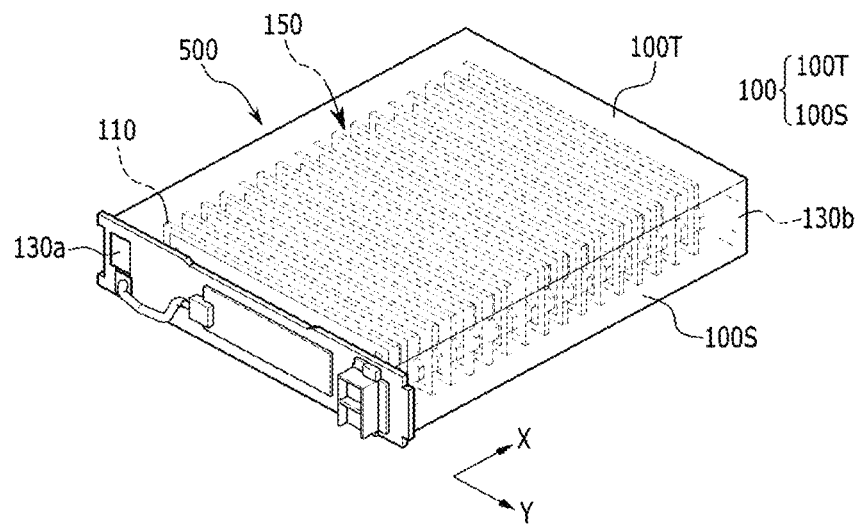
[FIG. 2]
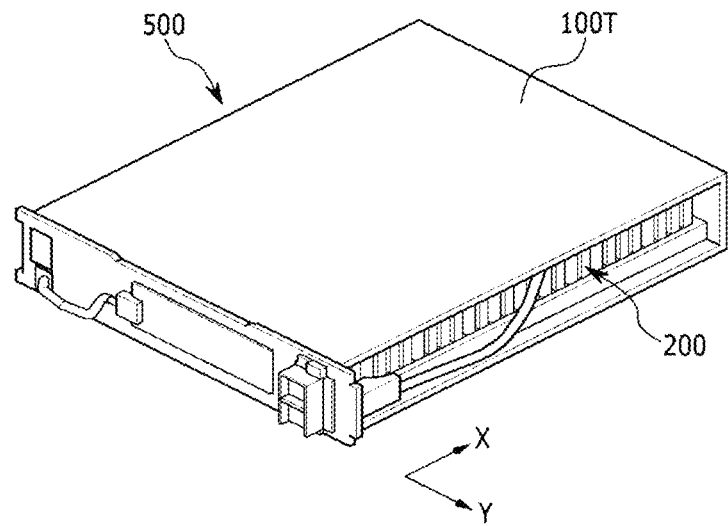

[FIG. 3]
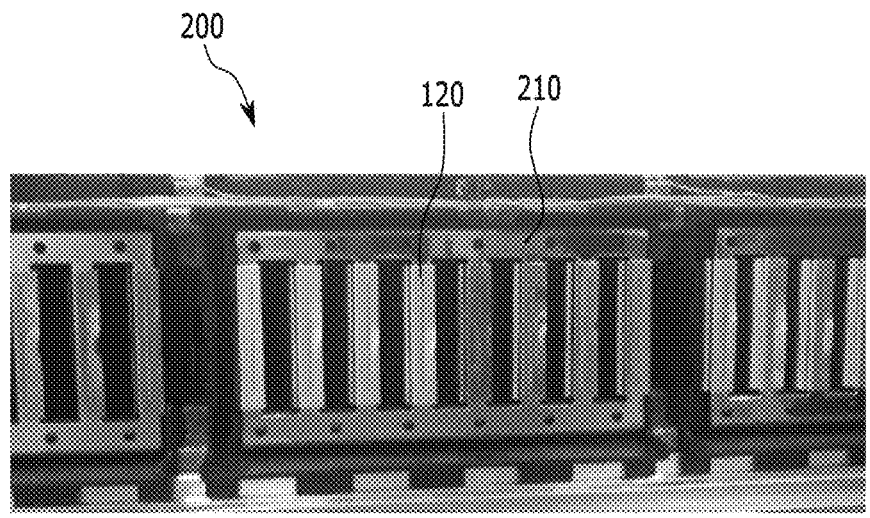
[FIG. 4]
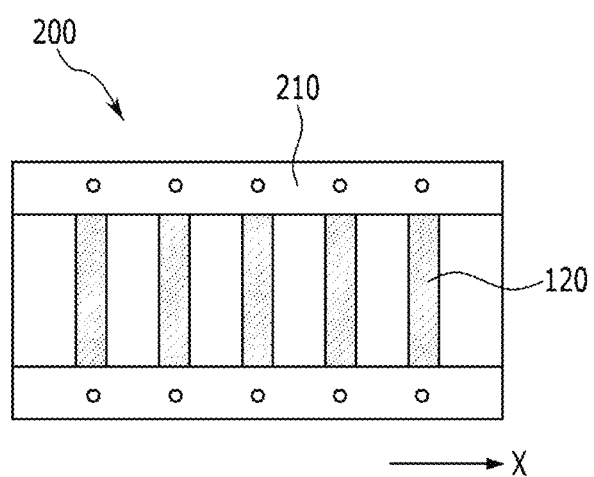

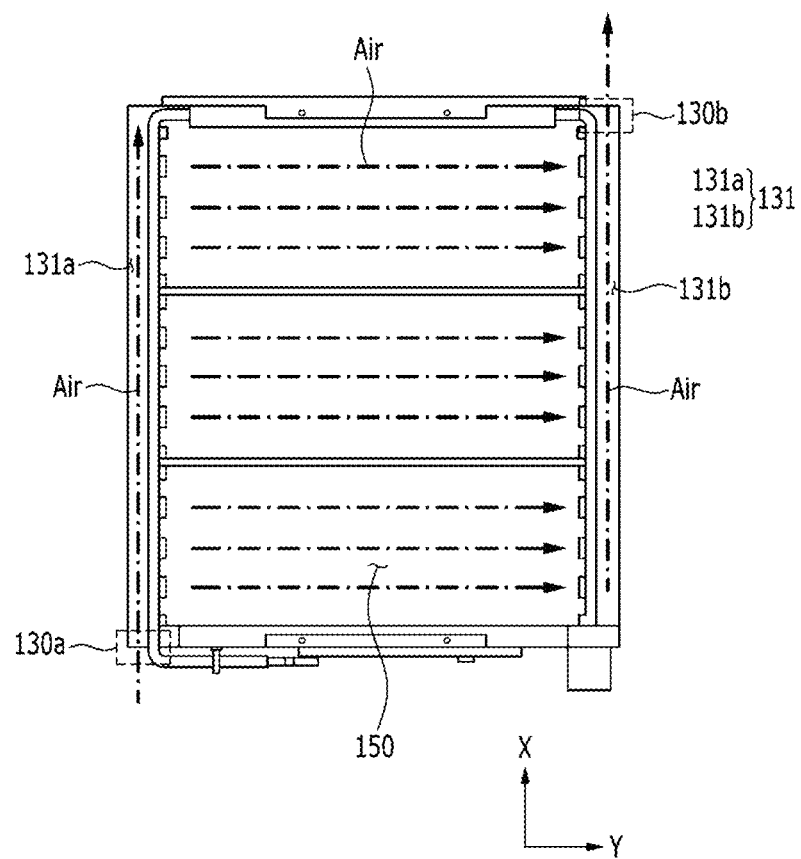
[FIG. 5]

[FIG. 6]
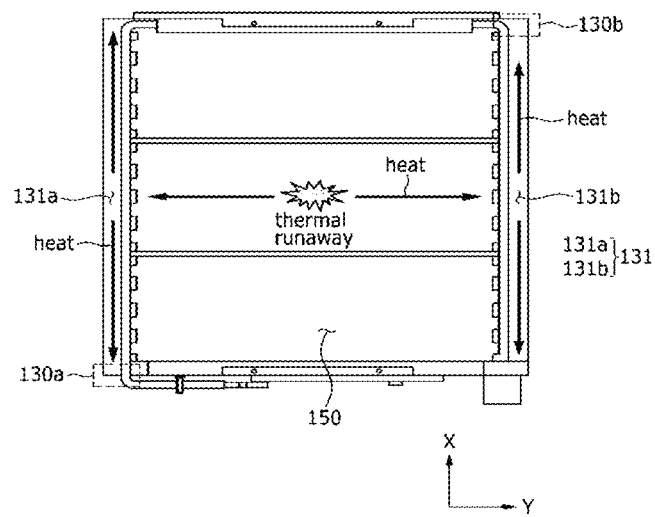
[FIG. 7]
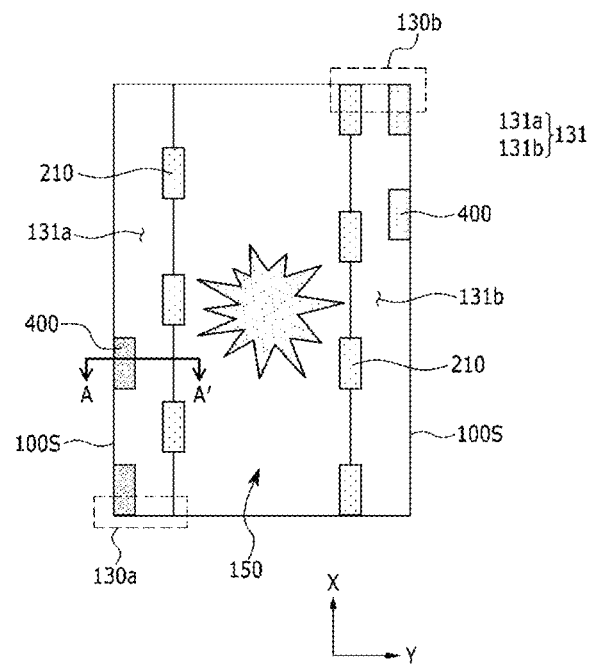

[FIG. 8]
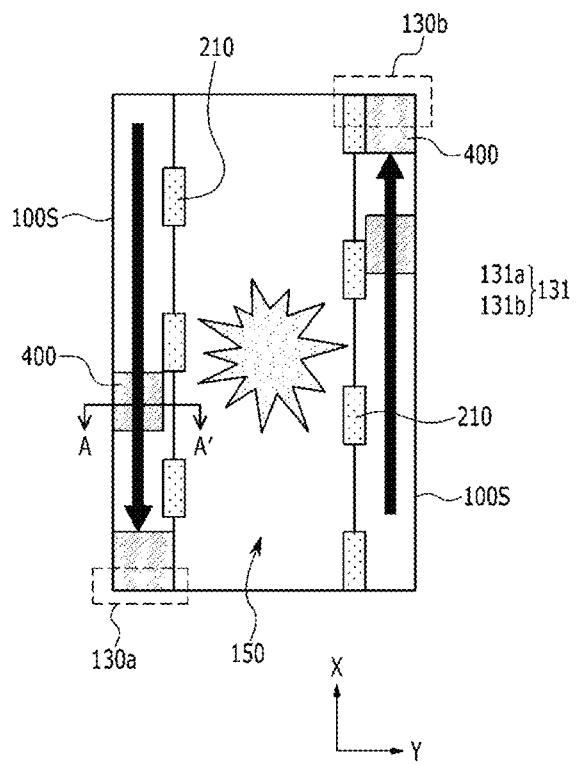
[FIG. 9]
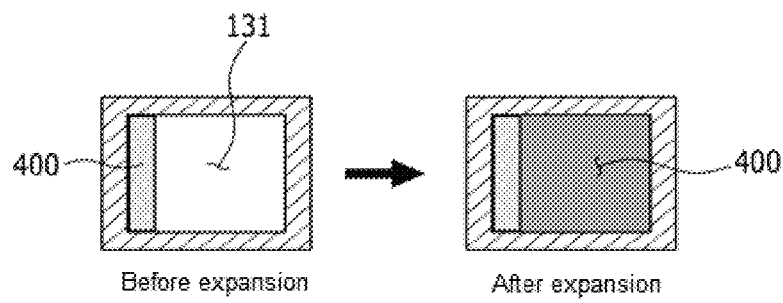

[FIG. 10]
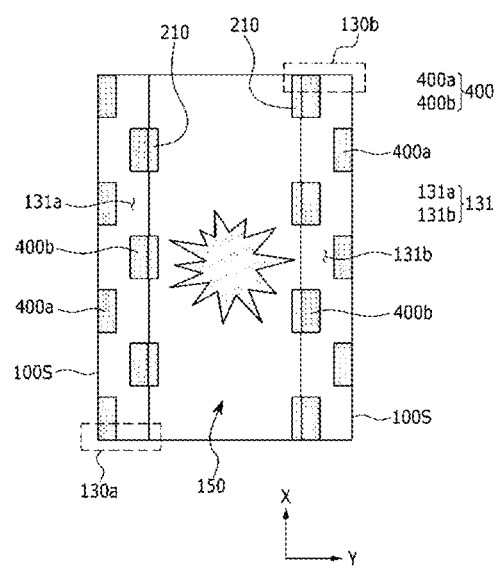
[FIG. 11]
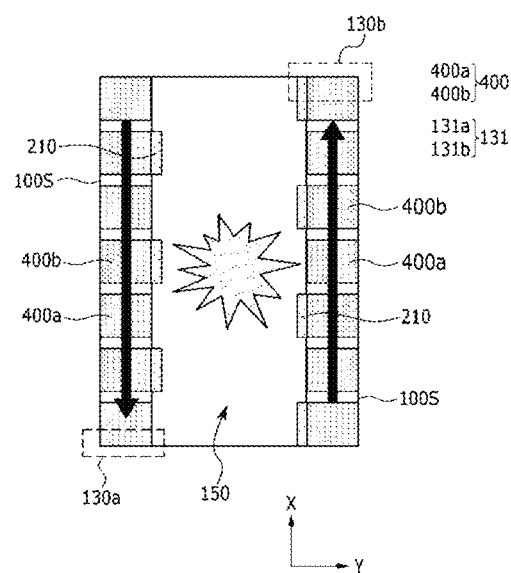

BATTERY MODULE AND BATTERY PACK INCLUDING THE SAME

CROSS CITATION WITH RELATED APPLICATION(S)

This application claims the benefit of Korean Patent Application No. 10-2019-0030175 filed on Mar. 15, 2019 with the Korean Intellectual Property Office, the disclosure of which is incorporated herein by reference in its entirety.

TECHNICAL FIELD

The present disclosure relates to a battery module and a battery pack including the same, and more particularly, to a battery module for preventing heat diffusion.

BACKGROUND ART

Secondary batteries have attracted considerable attention as a power source of electric vehicles, hybrid electric vehicles, plug-in hybrid electric vehicles and the like that are being presented as a method of solving air pollution and the like, caused by conventional vehicles, diesel vehicles and the like using fossil fuels.

In small-sized mobile devices, one or several battery cells are used per device, while in middle- or large-sized devices such as vehicles, a middle- or large-sized battery module in which a large number of battery cells are electrically connected is used due to necessity of high output and large capacity.

Since it is preferable that the middle- or large-sized battery module is manufactured with as small a size and as light a weight as possible, a prismatic battery, a pouch-shaped battery, and the like, which may be stacked with a high degree of integration and have light weight compared to capacity, are mainly used as a battery cell of the middle- or large-sized battery module. In particular, recently, a pouch-shaped battery using an aluminum laminate sheet or the like as an exterior member has attracted a great deal of attention due to its advantages such as light weight, low manufacturing cost, and easy shape modification.

Since battery cells constituting such a middle or large-sized battery module are secondary batteries which can be charged and discharged, such high-output large-capacity secondary battery generates a large amount of heat during a charging and discharging process. In particular, since the laminate sheet of the pouch-shaped battery widely used in the battery module is surface-coated with a polymer material having low thermal conductivity, it is difficult to effectively reduce a temperature of all of the battery cells.

When heat generated during the charging and discharging process is not effectively eliminated, heat accumulation may occur, which may accelerate deterioration of the battery cell, and according to circumstances, the battery module may catch fire or explode. Consequently, a middle or large-sized battery pack for vehicles or a middle or large-sized battery packs for power storage devices, which is a high-power, large-capacity battery including a plurality of middle- or large-sized battery modules, needs a cooling system to cool battery cells mounted in the battery pack.

In general, water-cooling type and air-cooling type can be used for the cooling system. The air-cooling type tends to be widely used due to electric leakage or waterproof problems of a secondary battery. In the case of a battery module having an air-cooling type structure, the internal battery can be cooled by using an external air so that the battery system can be used reliably for a long period of time. However, when high-temperature gas and flame released by causing a thermal runaway in one battery cell are discharged to the outside and propagated to adjacent battery cells or flammable materials, it may cause great damage.

DETAILED DESCRIPTION OF THE INVENTION

Technical Problem

It is an object of the present disclosure to provide a battery module that prevents gas and flames from being exposed to the outside and thus prevents heat diffusion to adjacent regions, and a battery pack including the same.

However, the problem to be solved by embodiments of the present disclosure is not limited to the above-described problems, and can be variously expanded within the scope of the technical idea included in the present disclosure.

Technical Solution

According to one embodiment of the present disclosure, there is provided a battery module having an air-cooling structure comprising: a battery cell stack containing a plurality of battery cells, a busbar frame connected to the battery cell stack and containing a busbar, and a cover plate covering the battery cell stack and the busbar frame, wherein a cooling flow path portion through which an external air for cooling inflows or outflows is formed between the cover plate and the battery cell stack, wherein at least one thermal expansion member is formed in the cooling flow path portion, and wherein the at least one thermal expansion member includes a first thermal expansion member located on a side opposite a side where the busbar is located on the cooling flow path portion.

The cooling flow path portion includes an inflow path portion located on one side of the battery cell stack and having an inflow port through which an air for cooling inflows, and an outflow path portion located on the other side of the battery cell stack and having an outflow port through in which an air for cooling outflows, and the at least one thermal expansion member may be formed adjacent to the inflow port and/or the outflow port.

The thickness of the at least one thermal expansion member may expand so that heat caused by the venting gas and flame generated from the battery cell is prevented from being discharged to the outside through the inflow port and the outflow port, thereby blocking the cooling flow path portion. The thickness expansion direction of the at least one thermal expansion member may be perpendicular to a direction in which the cooling flow path portion extends.

The at least one thermal expansion member may be a plurality of thermal expansion members.

The plurality of thermal expansion members and the busbar may be offset from each other.

The at least one thermal expansion member and the busbar may not overlap each other in a direction perpendicular to a direction in which the cooling flow path portion extends.

The at least one thermal expansion member may further include a second thermal expansion member located on the busbar.

The directions in which the thicknesses of the first thermal expansion member and the second thermal expansion member expand may be opposite to each other.

The cover plate includes a side plate located in a direction facing the welded part of the electrode lead and the busbar, and the first thermal expansion member may be located on the side plate.

According to another embodiment of the present disclosure, there is provided a battery pack comprising the above-mentioned battery module.

Advantageous Effects

According to the embodiments, in a general secondary battery operating environment, a path for cooling is provided, and in an abnormal situation such as thermal runaway, a material having expanding properties is formed in the cooling path, thereby providing a battery module and a battery pack capable of preventing gases and flames from being exposed to the outside and preventing heat diffusion to adjacent regions.

BRIEF DESCRIPTION OF THE DRAWINGS

FIG. 1 is a perspective view showing a battery module structure according to an embodiment of the present disclosure.

FIG. 2 is a perspective view showing a structure in which the busbar frame is exposed in the battery module of FIG. 1.

FIG. 3 is a view in which the busbar frame is exposed in the battery module of FIG. 2.

FIG. 4 is a cross-sectional view showing the configuration of the busbar frame of FIG. 3.

FIG. 5 is a diagram showing the flow of air in the normal operating state of the battery module of FIG. 1.

FIG. 6 is a plan view showing a path through which heat is transferred due to thermal runaway generated in the battery cell of the battery module of FIG. 5.

FIG. 7 is a schematic plan view showing a cooling flow path portion of the battery module of FIG. 1.

FIG. 8 is a plan view showing a state in which the thermal expansion member is changed due to thermal runaway generated in the battery cell of the battery module of FIG. 7.

FIG. 9 is a cross-sectional view taken across the cooling flow path along the line A-A' of FIGS. 7 and 8, before and after expansion of the thermal expansion member.

FIG. 10 is a schematic plan view showing a cooling flow path portion of the battery module according to another embodiment of the present disclosure.

FIG. 11 is a plan view showing a state in which a thermal expansion member is changed due to thermal runaway generated in a battery cell of the battery module of FIG. 10.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" or "comprising" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

FIG. 1 is a perspective view showing a battery module structure according to an embodiment of the present disclosure. FIG. 2 is a perspective view showing a structure in which the busbar frame is exposed in the battery module of FIG. 1. FIG. 3 is a view in which the busbar frame is exposed in the battery module of FIG. 2. FIG. 4 is a cross-sectional view showing the configuration of the busbar frame of FIG. 3.

Referring to FIGS. 1 and 2, the battery module 500 according to the present embodiment includes a battery cell stack 150 including a plurality of battery cells 110, and includes a cover plate 100 surrounding the battery cell stack 150. The cover plate 100 includes an upper and lower plate 100T and a side plate 100S, and a busbar frame 200 described later may be disposed between the side plate 100S and the battery cell stack 150. The busbar frame 200 is located on the side of the battery cell stack 150, a cooling flow path portion described later may be formed in a space between the busbar frame 200 and the side plate 100S. Here, the side surface of the battery cell stack 150 is defined as a surface facing a second direction Y perpendicular to the first direction X, which is the direction in which the battery cells 110 are stacked in the battery cell stack 150.

The battery module 500 according to the present embodiment has an air-cooling type structure. In order to cool the heat generated in the battery cell 110 using an external air, an inflow port 130a and an outflow port 130b injecting an external air are formed. Air that has entered through the inflow port 130a may pass through the battery cells 110 via a cooling flow path portion described later and exit through the outflow port 130b again.

Referring to FIGS. 3 and 4, in the busbar frame 200, the electrode leads 120 extended from the battery cells 110 of the battery cell stack 150 described in FIG. 1 stretches in the second direction Y shown in FIG. 1, passes through a lead slot (not shown) formed in the busbar frame 200, is bent at the rear surface of the busbar frame 200, and is electrically connected together with the busbar 210 via laser welding. At this time, heat caused by the high-temperature gas and flame generated by thermal runaway can be quickly transferred to adjacent battery cells 110 via the electrode lead 120 and the busbar 210. According to the present embodiment, this is because a large heat propagation delay effect can be obtained by a thermal expansion member described later. Specifically, when thermal runaway occurs in the battery cell 110 located inside the battery module 500, high-temperature gases and flames are discharged toward the electrode lead 120 corresponding to a relatively weak sealing part, and these may be propagated through a path for cooling the battery module 500. At this time, heat is greatly transferred through the busbar 210 exposed to the outside, this heat may enter the battery cell 110 again and cause rapid heat propagation therein. Thus, it is very important to block heat transfer through the busbar 210.

Hereinafter, in the battery module according to the embodiment of the present disclosure described in FIGS. 1 to 4, the normal operating state and the flow of heat during occurrence of thermal runaway will be compared and described.

FIG. 5 is a diagram showing the flow of air in the normal operating state of the battery module of FIG. 1. FIG. 6 is a plan view showing a path through which heat is transferred due to thermal runaway generated in the battery cell of the battery module of FIG. 5.

Referring to FIG. 5, air enters through the inflow port 130a formed under the left side, passes through the battery cell stack 150 between the cooling flow path portions 131 and passes through the outflow port 130b formed above the right side, and air escapes through the outflow port 130b formed in the right upper part, to thereby cool heat generated in the internal battery cell. Specifically, the cooling flow path portion 131 includes an inflow path portion 131a and an outflow path portion 131b, air that has entered through the inflow port 130a moves along the inflow path portion 131a, air passes in the right direction, and then moves along the outflow path portion 131b, thereby allowing the air to escape through the outflow port 130b.

Referring to FIG. 6, when thermal runaway occurs in a normal operating state of the battery, high-temperature gases and flames are propagated through a cooling path. In the case of a conventional battery module in which the busbar is exposed to the cooling path as it is, heat transfer between battery cells may occur simultaneously and frequently due to rapid heat transfer.

FIG. 7 is a schematic plan view showing a cooling flow path portion of the battery module of FIG. 1. FIG. 8 is a plan view showing a state in which the thermal expansion member is changed due to thermal runaway generated in the battery cell of the battery module of FIG. 7. FIG. 9 is a cross-sectional view taken across the cooling flow path portion along the line A-A' of FIGS. 7 and 8, before and after expansion of the thermal expansion member.

In order to block the rapid heat transfer that may occur as described with reference to FIG. 6, in the battery module according to the present embodiment, a thermal expansion member 400 is formed in the cooling flow path portion 131 as shown in FIG. 7. The thermal expansion member 400 may include one of a butyl-based material, an epoxy material, a vinyl chloride-based material, and an EPDM rubber material (ethylene propylene diene methylene rubber).

The thermal expansion member 400 according to the present embodiment may be located on a side opposite to one side where the busbar 210 is located on the basis of the cooling flow path portion 131. The thermal expansion member 400 may be formed on the side plate 100S. Preferably, the thermal expansion member 400 may be formed adjacent to the inflow port 130a and/or the outflow port 130b. Since the inflow port 130a and the outflow port 130b are closest to the external air, the flame generated inside meets oxygen and the possibility of explosion is high, so that it is effective to form a thermal expansion member 400 near the inflow port 130a and the outflow port 130b or at the inflow port 130a and the outflow port 130b.

The thermal expansion member 400 may be formed of plural members, and the plural thermal expansion members 400 are formed to be spaced apart along the inflow path portion 131a, and the plural thermal expansion members 400 may be formed to be spaced apart along the outflow path portion 131b. The plural thermal expansion members 400 may be arranged to be dislocated with the busbar 210. In a modified embodiment, the thermal expansion member 400 and the busbar 210 may not overlap each other in a direction perpendicular to a direction in which the cooling flow path portion 131 extends.

Referring to FIG. 8, when thermal runaway occurs in the battery cells included in the battery cell stack 150, the thickness of the thermal expansion member 400 expands to allow heat caused by venting gases and flames to be not discharged to the outside through the inflow port 130a and the outflow port 130b. That is, the cooling flow path portion 131 may be blocked by the thermal expansion member 400 according to the present embodiment.

Referring to FIG. 9, looking at the state before and after the expansion of the thermal expansion member 400, when the thermal expansion member 400 covering a part of the cross section of the cooling flow path portion 131 causes thermal runaway in the battery cell laminate 150 of FIG. 7, the thickness can be expanded to block the cross section of the cooling flow path portion 131. In this case, a direction in which the thickness of the thermal expansion member 400 expands may be perpendicular to a direction in which the cooling flow path portion 131 extends. That is, the thickness of the thermal expansion member 400 may expand along the Y-axis direction shown in FIG. 8.

FIG. 10 is a schematic plan view showing a cooling flow path portion of the battery module according to another embodiment of the present disclosure. FIG. 11 is a plan view showing a state in which a thermal expansion member is changed due to thermal runaway generated in a battery cell of the battery module of FIG. 10.

Referring to FIG. 10, the battery module according to the present embodiment is mostly the same as the embodiment described with reference to FIGS. 8 and 9. However, the thermal expansion member 400 according to the present embodiment includes a first thermal expansion member 400a and a second thermal expansion member 400b. The first thermal expansion members 400a may be formed of plural members on the side plate 100S, and the second thermal expansion member 400b may be located on the busbar 210. At this time, the first thermal expansion member 400a and the second thermal expansion member 400b may be arranged to be dislocated from each other.

Referring to FIG. 11, when thermal runaway occurs in the battery cells included in the battery cell stack 150, the thicknesses of the first thermal expansion member 400a and the second thermal expansion member 400b expand, respectively, thereby prevent heat due to the venting gas and flame from being discharged to the outside through the inflow port 130a and the outflow port 130b. That is, it is possible to prevent the high-temperature gas and flame generated by a thermal runaway from being discharged in the direction of the arrow by the thermal expansion member 400 according to the present embodiment. According to the present embodiment, by disposing the first thermal expansion member 400a and the second thermal expansion member 400b at intersections on the top and side plates 100S of the busbar 210, the internal space can be more efficiently reduced to block the cooling flow path portion 131.

In this case, directions in which the thickness of each of the first thermal expansion member 400a and the second thermal expansion member 400b expands may be opposite to each other.

Meanwhile, in the battery module according to an embodiment of the present invention, one or more of the battery modules may be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto but can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

130a: inflow port
130b: outflow port
210: busbar
131: cooling flow path portion
131a: inflow path portion
131b: outflow path portion
400: thermal expansion member

The invention claimed is:

1. A battery module having an air-cooling structure comprising:
a battery cell stack containing a plurality of battery cells,
a busbar frame connected to the battery cell stack and containing a busbar, and
a cover plate covering the battery cell stack and the busbar frame and including a side plate,
wherein a cooling flow path portion through which an external air for cooling inflows or outflows is formed between the busbar frame and the side plate, the busbar frame and the side plate being spaced from each other in a first direction,
wherein a plurality of unexpanded thermal expansion members are formed in the cooling flow path portion,
wherein the plurality of unexpanded thermal expansion members includes at least one first unexpanded thermal expansion member located on an internal surface of the side plate and at least one second unexpanded thermal expansion member located on the busbar, and
wherein the at least one first unexpanded thermal expansion member and the at least one second unexpanded thermal expansion member are offset from each other in a second direction.

2. The battery module of claim 1, wherein the cooling flow path portion includes an inflow path portion located on one side of the battery cell stack and having an inflow port through which an air for cooling inflows, and an outflow path portion located on the other side of the battery cell stack and having an outflow port through which an air for cooling outflows, and
wherein the at least one unexpanded thermal expansion member of the plurality of unexpanded thermal expansion members is formed adjacent to the inflow port and/or the outflow port and blocks the inflow port and/or the outflow port when expanded.

3. The battery module of claim 2, wherein the thickness of the at least one unexpanded thermal expansion member expands so that heat caused by the venting gas and flame generated from the battery cell is prevented from being discharged to the outside through the inflow port and the outflow port, thereby blocking the cooling flow path portion.

4. The battery module of claim 1, wherein the thickness expansion direction of the plurality of unexpanded thermal expansion members is in the first direction.

5. The battery module of claim 1, wherein the directions in which the thicknesses of the first unexpanded thermal expansion member and the second unexpanded thermal expansion member expand are opposite to each other.

6. The battery module of claim 1, wherein the side plate is located in a direction facing a welding portion of an electrode lead and the bus bar.

7. A battery pack comprising the battery module according to claim 1.

8. The battery module of claim 1, wherein the cooling flow path portion includes a first section in a direction of air flow and a second direction perpendicular to the air flow,
wherein the at least one first unexpanded thermal expansion member and the at least one second unexpanded thermal expansion member are in the first section.

9. The battery module of claim 8, wherein the plurality of battery cells are stacked in the first direction.

10. The battery module of claim 1, wherein the cover plate has an inflow port and an outflow port, and
wherein the at least one first unexpanded thermal expansion member is located between the inflow port and the outflow port.

11. The battery module of claim 1, wherein the at least one first unexpanded thermal expansion member and the at least one second unexpanded thermal expansion member do not contact each other when expanded.

12. The battery module of claim 1, wherein the at least one first unexpanded thermal expansion member is a plurality of first unexpanded thermal expansion members and the at least one second unexpanded thermal expansion member is a plurality of second unexpanded thermal expansion members.

13. The battery module of claim 1, wherein the at least one first unexpanded thermal expansion member contacts the busbar when expanded and the at least one second unexpanded thermal expansion member contacts the side plate when expanded.

* * * * *